United States Patent Office 3,515,785
Patented June 2, 1970

---

3,515,785
COMPOSITIONS AND METHODS FOR TREATING ENDOGENOUS DEPRESSION WITH 3-CHLORO - 5 - (γ - DIMETHYLAMINO - PROPYL)-IMINODIBENZYL
Walter Schindler, Riehen, and Henri Dietrich, Arlesheim, Basel-Land, Switzerland, assignors to Geigy Chemical Corporation, Greenburgh, N.Y., a corporation of Delaware
No Drawing. Continuation-in-part of application Ser. No. 857,274, Dec. 4, 1959. This application Nov. 16, 1964, Ser. No. 411,552
Claims priority, application Switzerland, Dec. 6, 1958, 67,046/58, 67,049/58; Jan. 12, 1959, 68,201/59
Int. Cl. A61k 27/00
U.S. Cl. 424—244                   7 Claims

---

ABSTRACT OF THE DISCLOSURE

A method of treating endogenous depression by the administration of 3-chloro-5-(γ-dimethylamino-propyl)-iminodibenzyl; and an antidepressive composition containing the compound and a pharmaceutical carrier.

---

This is a continuation-in-part application of our copending application Ser. No 857,274, filed Dec. 4, 1959.

The present invention concerns pharmaceutically useful compositions and methods, involving the use of new N-heterocyclic compounds.

10, 11-dihydro-5H-dibenzo[b,f]azepines (also termed "iminodibenzyls") and 5H-dibenzo[b,f]azepines (also termed "iminostilbenes") chlorinated in only one of the two benzene rings in their molecules as well as derivatives thereof have not been known up to now. It has now been found that N-substituted derivatives of such compounds corresponding to the general formula

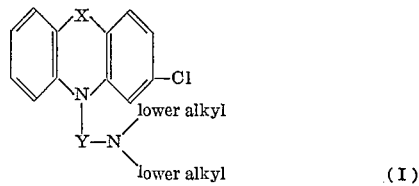

(I)

wherein X represents a member selected from the group consisting of the radical —CH₂—CH₂— and the radical —CH=CH—, and Y represents an alkylene radical with 2–3 carbon atoms, have valuable pharmacological properties, in particular antiallergic, sedative, spasmolytic, serotonin antagonistic, antiemetic and adrenolytic activity; for example they also restrict the saliva secretions caused by pilocarpine. These substances can be administered perorally and, optionally, also subcutaneously among other purposes for the treatment of certain forms of mental disorders, in particular depressions, for the treatment of allergic rhinitis as well as to potentiate the action of other pharmaceuticals, in particular, anaesthetics. Of the compounds according to the invention, the ones of particular value are those in which X in general Formula I is —CH₂—CH₂—.

Quaternary ammonium salts which are derived from the tertiary bases defined above have ganglioplegic activity.

A particularly useful compound according to the invention is the 10,11-dihydro-5H-dibenzo[b,f]azepine of the formula

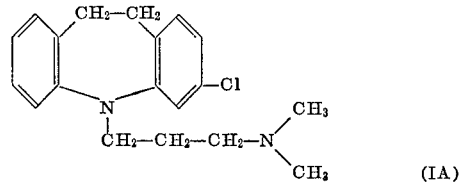

(IA)

which is distinguished by a strong quick onset of thymoleptic activity as evidenced pharmacologically by strong and promptly acting reserpine antagonism, accompanied, surprisingly, by a distinct neuroleptic component, as shown pharmacologically by a catatonic effect as well as distinct adrenolytic activity. The compound of the last-shown formula, 3 - chloro-5-(γ-dimethylamino-propyl)-iminodibenzyl, also shows bacteriostatic, fungistatic and spasmolytic activity.

As a result of the various above-listed pharmacological properties, the combined presence of which in one and the same substance is in itself surprising and the co-action of which is not at present fully understood, the compound of Formula IA possesses an outstanding effectiveness in cases of endogenous depressions and depressions in schizophrenia. This could not be expected from the structure of the compound of Formula IA, for the known 3,7-dichloro-5-(γ-dimethylamino-propyl)-iminodibenzyl has shown complete failure in such depressions.

Moreover, the compound of Formula IA is useful in the case of psychosomatic afflictions especially of the intestinal tract in which a state of depression is either the cause or a symptom. It is administered in a dose of 10 to 150 milligrams/kg. of body weight per average adult patient.

In these cases, the known 5-(γ-dimethylamino-propyl)-iminodibenzyl, which has neither catatonic properties nor the strong adrenolytic activity, which is characteristic for neuroleptics, but on the contrary is strongly anticatatonic and further differs pharmacologically from the compound of Formula IA by possessing a strong antihistaminic activity, either fails or is of much inferior effect.

The new compounds are produced by reacting a 3-chloro - 10,11 - dihydro - 5H-dibenzo[b,f]azepine or a 3-chloro-5H-dibenzo[b,f]azepine corresponding to the general formula

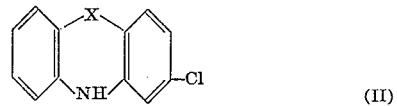

(II)

wherein X has the same meaning as in Formula I, which in the following will be termed 3-chloro-iminodibenzyls or 3-chloro-iminostilbenes, respectively, with a reactive ester of an alcohol of the general formula

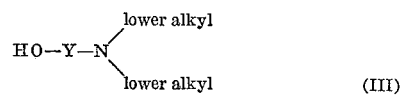

(III)

wherein Y has the meanings given above, the reaction being performed in the presence of a condensing agent.

Suitable condensing agents are, in particular, sodium amide, lithium amide, potassium amide, sodium or potassium, butyl lithinum, phenyl lithium, sodium hydride or lithium hydride. The reaction can be performed in the presence or absence of an inert organic solvent, as examples of which can be named benzene, toluene and xylenes.

As reactive esters of amino alcohols of the general Formula III, in particular the halides are used; individually can be named: dimethylaminoethyl chloride, diethylaminoethyl chloride, methylethylaminoethyl chloride, β-dimethylaminopropyl chloride, β-dimethylamino-isopropyl chloride, γ-dimethylaminopropyl chloride, β-(di-n-propylamino)-ethyl chloride, β-(methyl-isopropylamino)-ethyl chloride, β-(di-n-butylamino)-ethyl chloride and β-(di-isobutylamino)-ethyl chloride.

Starting materials of Formula II are 3-chloroiminodibenzyl and 3-chloro-iminostilbene. The iminodibenzyl derivatives falling under Formula II are obtained from unsubstituted iminodibenzyl by N-acylation, reaction with acetyl chloride according to Friedel-Crafts, treatment with hydrazoic acid according to Schmidt, partial hydrolysis of the 3-acetamido-5-acyl-iminodibenzyl obtained, diazotisation of the 3-amino-5-acyl compounds, reaction of the diazonium halides with cupric halides according to Sandmeyer and hydrolytic splitting off of the 5-acyl radical, as described in detail in U.S. Pat. 3,056,775. The iminostilbene derivatives can be obtained from the corresponding 5-acyl-iminodibenzyl derivatives by halogenation in the 10-position, e.g. with N-bromosuccinimide, splitting off hydrogen halide and hydrolysis, for example with caustic alkali in the cold.

The new N-heterocyclic compounds of Formula I are obtained by a further process in which a compound falling under the formula

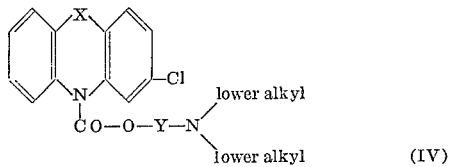

(IV)

wherein X and Y have the same meanings as in Formula I, is heated until one mol of carbon dioxide has been split off. The compounds of Formula IV are produced, in turn, by reacting phosgene with a compound of Formula II and reacting the resultant 3-chloro-5-chlorocarbonyl-iminodibenzyl or -iminostilbene with an amino alcohol of Formula III.

A third process for the production of compounds of Formula I consists in reacting a reactive ester of a compound of the formula

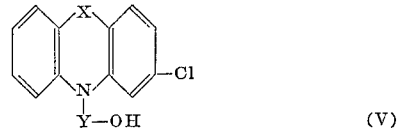

(V)

wherein X and Y have the meanings given above, with a secondary amine of the formula

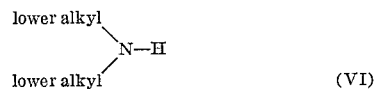

(VI)

The reaction can be prefromed for example at a moderately elevated temperature of about 80–120° C. in an inert solvent such as a lower alkanol or lower alkanone. Advantageously an excess of the amine used in the reaction is used as acid binding agent. Sometimes, the reaction is performed in a closed vessel; this depends on the boiling point of the amine and the solvent used and also on the temperature necessary to perform the reaction. Reactive esters of commands of Formula V are obtained, for example, by reacting alkali metal compounds of iminodibenzyls or of iminostilbenes falling under Formula II with an alkylene oxide, e.g. ethylene oxide and reaction the hydroxyalkyl derivatives obtained with inorganic acid halides, methane sulfonic acid chloride or aryl sulfonic acid chlorides. 5-(halogeno-alkyl)-iminodibenzyls, 5-(methane - sulfonyloxy-alkyl) - iminodibenzyl, 5-(arylsulfonyloxy-alkyl)-iminodibenzyls or the corresponding iminostilbene derivatives are then obtained. These can be reacted, for example, with dimethylamine, methylethylamine, diethylamine or another di(lower alkyl)-amine.

Compounds of Formula I are obtained by yet another process in which a compound of the formula

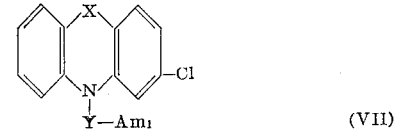

(VII)

wherein $Am_1$ represents the primary amino group or a monoalkylamino group and X and Y have the meanings given above, is treated with a low molecular alkylating agent. Starting materials of Formula VII are obtained, for example, by reacting ammonia or a mono-lower alkylamine analogously to the previous process, instead of a secondary amine of Formula VI, with a reactive ester of a compound of Formula V or also by reducing or hydrogenating a 3-chloro-5-cyanoalkyl iminodibenzyl or -iminostilbene. Examples of low molecular alkylating agents are dimethyl sulfate, diethyl sulfate, methyl iodide, ethyl iodide, ethyl bromide, n-propyl bromide and p-toluene sulfonic acid methyl ester in the presence of acid binding agents such as sodium or potassium carbonate, and of an inert organic solvent. Formaldehyde in the presence of formic acid can also be used.

Finally, compounds of Formula I can also be produced by reacting compounds of the formula

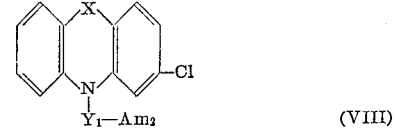

(VIII)

wherein $Y_1$ and $Am_2$ represent radicals corresponding to the definitions given for Y and Am above but in one of the two radicals, at least one methylene group bound to a nitrogen atom is replaced by a carbonyl group —CO—, and X has the same meaning as in Formula I, with an alkali metal-earth metal hydride, in particular with lithium-aluminum hydride. This process is of importance particularly for the production of N',N'-disubstituted 3-chloro-5-(α-aminomethyl-alkyl)-iminodibenzyls or -iminostilbenes because these compounds can be obtained, for example, by the first process only with the isomeric, N',N'-disubstituted 3-chloro-5-(β-aminoalkyl)-iminodibenzyls or -iminostilbenes formed by molecular rearrangement. The N',N' - disubstituted 3-chloro-5-(α-carbamyl-alkyl)-iminodibenzyls or -iminostilbenes necessary for the production of the above compounds are obtained, for example, by reaction of alkali metal compounds of 3-chloro-iminodibenzyls or -iminostilbenes of Formula II with low molecular α-bromo-alkane carboxylic acid dialkylamides. Further starting materials of Formula VIII are, for example, the 3-chloro- substituted 5-(dialkylamino-alkanoyl)-, 5-(piperidino - alkanoyl)-, 5 - (N' - alkyl - alkanoylamino-alkyl)-, 5-(N',N'-dialkanoyl-aminoalkyl)-, 5-succinimidoalkyl- and 5-glutarimidoalkyl-iminodibenzyls and -iminostilbenes. The 5-dialkyl-aminoalkanoyl compounds are obtained, for example, by reacting alkali metal compounds of 3-chloro-iminodibenzyls or -iminostilbenes of Formula II with halogen alkane carboxylic acid halides and then reacting the resulting 5-chloro-alkanoyl compounds with suitable amines of Formula VI. The other starting materials mentioned above are obtained, for example, by reacting reactive esters of compounds of Formula V with alkali metal compounds of alkane carboxylic acid-N-alkylamides, succinimide or glutarimide, or by acylating 3-chloro-5-monoalkylaminoalkyl or 3-chloro-5-aminoalkyl iminodibenzyls or iminostilbenes of Formula VII.

Monoquaternary ammonium compounds according to the invention are obtained from the tertiary amines of Formula I in a conventional manner by addition reaction with reactive esters, in particular halides or sulfates of aliphatic or araliphatic alcohols, e.g. methyl iodide, dimethyl sulfate, ethyl bromide, ethyl iodide or benzyl chloride. The group

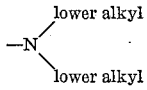

is quaternized by this reaction.

The new tertiary bases used according to the present invention form pharmaceutically acceptable salts, some of which are water soluble with inorganic or organic acids such as hydrochloric acid, hydrobromic acid, sulfuric acid, phosphoric acid, methane sulfonic acid, ethane disulfonic acid, acetic acid, citric acid, malic acid, succinic acid, fumaric acid, maleic acid, tartaric acid, benzoic acid and phthalic acid.

The following non-limitative examples further illustrate the production of the new compounds. Parts and percentages are given therein by weight unless expressly stated otherwise, their relationship to parts by volume is as that of grams (g.) to milliliters (ml.) The temperatures are in degrees centigrade.

EXAMPLE 1

22.9 parts of 3-chloro-iminodibenzyl are dissolved in 300 parts by volume of xylene, and 4 parts of sodium amide, pulverized and suspended in toluene, are added thereto while stirring and maintaining the whole under a nitrogen atmosphere. The xylene solution immediately turns dark colored, but upon crystallization of the sodium salt therefrom it becomes again light-colored. The reaction mixture is stirred for about 2 hours at 80° until the development of ammonia has terminated. A solution of γ-dimethylaminopropyl chloride in toluene, prepared by setting free a corresponding amount of the free base from 17.4 parts of its hydrochloride salt by addition of aqueous sodium hydroxide solution in about 10% excess, extraction with toluene and drying for 2 hours over anhydrous sodium sulfate is added to the xylene solution containing the sodium salt mentioned above and the whole is stirred under reflux for 15 hours. Precipitated sodium chloride is filtered off and the filtrate is concentrated. The residue is diluted with ether, and the hydrochloride of 3-chloro-5-(γ-dimethylaminopropyl)-iminodibenzyl is precipitated by introducing dry, gaseous hydrogen chloride. It is filtered off under suction and purified by repeated recrystallization from acetone; the pure substance melts at 191.5–192°.

In an analogous manner, on using the base liberated from 17.4 parts of γ-diethylamino-propyl chloride-hydrochloride, 5-(γ-diethylaminopropyl)-3-chloro-iminodibenzyl is obtained.

EXAMPLE 2

23 parts of 3-chloro-iminodibenzyl are dissolved in 190 parts by volume of xylene, 4.3 parts of sodium amide (pulverized and suspended in toluene) are added and the whole is stirred for 3 hours at 80° in a nitrogen atmosphere. A benzene solution of dimethylamino-isopropyl chloride, liberated from 18 parts of its hydrochloride salt with aqueous sodium hydroxide solution, extracted with benzene, and dried for two hours over anhydrous sodium sulfate, is then added and the reaction mixture is refluxed for 16 hours while stirring. The precipitated sodium chloride is filtered off, washed with anhydrous ether and the hydrochloride of 3-chloro-5-(β-dimethylamino-isopropyl)-iminodibenzyl is precipitated from the filtrate by the introduction of dry, gaseous hydrogen chloride. It is recrystallized from a large volume of acetone and, in the pure state, it melts at 247°.

In an analogous manner, 3-chloro-5-(β-dimethylamino-ethyl)-iminodibenzyl is obtained by repeating the above example but using an equivalent amount of dimethylamino ethyl chloride in lieu of the above-used dimethylamino-isopropyl chloride.

EXAMPLE 3

23 parts of 3-chloro-iminostilbene dissolved in 250 parts by volume of anhydrous xylene, to which 4.3 parts of sodium amide, pulverized and suspended in toluene are added, are refluxed for 3 hours. A xylene solution of γ-dimethylamino-propyl chloride, liberated from 18 parts of its hydrochloride salt and extracted with xylene, is added and the whole is refluxed for 20 hours while stirring. The reaction mixture obtained is evaporated to dryness, ether is added to the residue and the basic portions are extracted from the ethereal solution with diluted hydrochloric acid. The acid extracts are made alkaline and the free base is dissolved in ethel. After drying and concentrating the ether solution, the desired 3-chloro-5-(γ-dimethylamino-propyl)-iminostilbene is obtained. Recrystallized from petroleum ether it melts at 53°.

To produce tablets and the like dosage units for oral application, the active substances above mentioned or the salts thereof are combined, e.g. with solid pulverulent carriers such as talcum, lactose, saccharose, sorbitol, mannite; starches such as potato starch, corn starch or amylopectin; cellulose derivatives or gelatin, possibly with the addition of lubricants such as magnesium or calcium stearate or polyethylene oxides of suitable molecular weights (Carbowax) and disintegrating agents such as, e.g. alginic acid, laminaria powder or citrus pulp powder, to from tablets or dragée cores.

Ampoules for parenteral, particularly intramuscular application preferably contain a water soluble salt of the active substance according to the invention and suitable stabilizing agents and, optionally, buffer substances in aqueous solution. Antioxidizing agents such as sodium bissulfite, sodium sulfite, ascorbic acid or rongalite (formaldehyde-sodium bisulfite compound) are suitable in particular as stabilizing agents either alone or combined, in total concentrations between about 0.1–0.5 per mille. Because of its ability to form chelates, ascorbic acid has an additional stabilizing effect; in this function it can also be replaced by other chelating agents. The best stability of the active ingredient is attained if the pH of the ampoule solutions is between 3.5 and 5. This range can be attained, e.g. by mixtures in suitable ratio of sodium sulfite, sodium bisulfite and/or ascorbic acid, or by the addition of other buffer substances such as citric acid and/or salts thereof. In addition, the ampoules can contain a slight amount of a usual conserving agent. The daily dosage of active substance according to the invention in the treatment of mental depression ranges from about 50 to 150 mg., for an average patient.

The following examples illustrate the production of typical forms of application for oral and for parenteral use, but the invention is in no way limited thereto.

EXAMPLE I 250 g. of 3-chloro-5-(γ-dimethylamino-propyl)-iminodibenzyl hydrochloride are mixed with 175.80 g. of lactose and 169.70 parts of potato starch, the mixture is moistened with an alcoholic solution of 10 g. of stearic acid in about 90 ml. of ethanol, and granulated through a sieve. After drying, 160 g. of potato starch, 200 g. of talcum, 2.50 g. of magnesium stearate and 32 g. of colloidal silicon dioxide are mixed therewith and the resulting mixture is pressed into 10,000 tablets each weighing 100 mg. and containing 25 mg. of the aforesaid active substance. The tablets can be marked with break lines if desired to enable a closer adaption of the dosage to be given.

EXAMPLE II

A granulate is prepared from 250 g. of 3-chloro-5-(γ-dimethylamino - propyl) - iminodibenzyl hydrochloride, 175.90 g. of lactose and the alcoholic solution of 10 g.

of stearic acid. After drying, the granulate is mixed with 56.60 g. of colloidal silicon dioxide, 165 g. of talcum, 20 g. of potato starch and 2.50 g. of magnesium stearate and pressed into 10,000 dragée centers. These are then coated with a concentrated syrup of 502.28 g. of crystallized saccharose, 6 g. of shellack, 10 g. of gum arabic, 0.22 g. of dyestuff and 1.5 g. of titanium dioxide and dried. The dragées obtained each weigh 120 mg. and contain 25 mg. of active substance.

EXAMPLE III

Manufacturing instructions for the production of coated tablets (dragées) containing 25 mg. of the active substance each.

To produce 10,000 dragées each containing 25 mg. of 3 - chloro-5-($\gamma$-dimethylamino-propyl)-iminodibenzyl, the following components are used:

(A)

| | G. |
|---|---|
| The aforesaid active substance | 250.0 |
| Lactose | 175.9 |

(B)

| | |
|---|---|
| Stearic acid | 10.0 |
| Ethanol (about 90 ml.) | q.s. |

(C)

| | |
|---|---|
| Potato starch | 20.0 |
| Talcum | 165.0 |
| Magnesium stearate | 2.5 |
| Colloidal silicon oxide | 56.6 |
| | 680.0 |

The substances listed under (A) are well mixed and moistened with the granulating solution (B). The moistened mass is granulated through a sieve having 49–64 meshes per square centimeter. The moist granulate is then dried for about 12 hours at about 20° and then passed again through a sieve of the same mesh number. The dried granulate is then intimately mixed with the substances listed under (C) and the resulting mass is compressed into cores of a weight of 68 mg. each containing 25 mg. of the aforesaid active substance.

The production of the dragées is then completed in a conventional manner by applying to the cores a conventional coating solution. In this manner, dragées each having a total weight (i.e. core plus coating) of about 100 mg. and containing 25 mg. of active substance are obtained.

EXAMPLE IV

Manufacturing instructions for the preparation of gelatin capsules each containing 25 mg. of active substance for rectal application.

To produce a capsule of 25 mg. of 3-chloro-5-($\gamma$-dimethylaminopropyl) - iminodibenzyl, the following are used:

| | G. |
|---|---|
| Active substance | 0.0250 |
| Butyl-hydroxy-toluene | 0.0002 |
| Paraffin (hard) | 0.0200 |
| Paraffin oil | 0.5348 |
| | 0.5800 |

The active substance and the paraffin are suspended in paraffin oil, as inert carrier, and butyl-hydroxy-toluene as antioxidant is added. The resulting liquid paste is then filled under sterile conditions into the soft gelatin capsules.

Similarly, gelatin capsules are obtained by replacing the active substance used in the above example by the same amount of 3 - chloro-5-($\beta$-dimethylamino-ethyl)-iminodibenzyl.

EXAMPLE V 1.25 g. of 3 - chloro - 5 - ($\gamma$-dimethylamino-propyl)-iminodibenzyl hydrochloride, 0.10 g. of ascorbic acid, 0.05 g. of sodium bisulfite and 0.10 g. of sodium sulfite are dissolved in distilled water until the volume is 100 ml. This solution is used to fill ampoules, each of preferably 2 ml. and containing 25 mg. of active substance. The ampoules are heat-sterilized.

We claim:

1. A method for treating endogenous depression which comprises the oral or parenteral administration to a patient of 3-chloro-5-($\gamma$-dimethylamino-propyl)-iminodibenzyl in an amount sufficient to produce an antidepressive effect in the case of the aforesaid type of depression.

2. A method as defined in claim 1, wherein the amount of said compound being administered daily, ranges from 10 to 150 milligrams per average adult patient.

3. A method according to claim 1, wherein the active compound is in the form of a pharamceutically acceptable acid addition salt thereof.

4. A method according to claim 1, wherein the active compound is in the form of hydrochloride.

5. An antidepressive agent, in dosage unit form, consisting essentially of an antidepressively effective amount of 3 - chloro - 5-($\gamma$-dimethylamino-propyl)-iminodibenzyl and a pharmaceutically acceptable, non-toxic carrier therefor.

6. An antidepressive agent according to claim 5, wherein the active compound is in the form of a pharmaceutically acceptable acid addition salt thereof.

7. An antidepressive agent according to claim 5, wherein the active compound is in the form of hydrochloride.

References Cited

UNITED STATES PATENTS

| 2,813,857 | 11/1957 | Schindler et al. | 260—239 |
| 3,068,222 | 12/1962 | Craig | 260—239 |
| 2,892,753 | 6/1959 | Schmidt et al. | 167—65 |
| 3,011,945 | 12/1961 | Bolling et al. | 167—65 |
| 2,554,736 | 5/1951 | Haeflenger. | |
| 2,813,857 | 11/1957 | Schindler. | |

OTHER REFERENCES

1. Chem. Abstracts, vol. 53, page 3469i (1959).
2. Kuhr Schweizerische Medizinische Wochenschrift N.R. 35/36 pages 1135–1140 (1957).

ALBERT T. MEYERS, Primary Examiner

S. J. FRIEDMAN, Assistant Examiner

U.S. Cl. X.R.

260—239

Disclaimer 3,515,785.—*Walter Schindler,* Riehen and *Henri Dietrich,* Arlesheim, Basel-Land, Switzerland. COMPOSITIONS AND METHODS FOR TREATING ENDOGENOUS DEPRESSION WITH 3-CHLORO-5-(γ-DIMETHYL-AMINO-PROPYL)-IMINODIBENZYL. Patent dated June 2, 1970. Disclaimer filed Oct. 22, 1984, by the assignee, *Ciba-Geigy Corp.*

Hereby enters this disclaimer to claims 2, 5, 6 and 7 of said patent.

[*Official Gazette December 11, 1984.*]